United States Patent [19]
Chavez

[11] Patent Number: 6,151,503
[45] Date of Patent: *Nov. 21, 2000

[54] SUBSCRIBER ACTIVATED WIRELESS TELEPHONE CALL REROUTING SYSTEM

[75] Inventor: David L. Chavez, Thornton, Colo.

[73] Assignee: Lucent Technologies Inc., Murray Hill, N.J.

[*] Notice: This patent issued on a continued prosecution application filed under 37 CFR 1.53(d), and is subject to the twenty year patent term provisions of 35 U.S.C. 154(a)(2).

[21] Appl. No.: 08/992,657

[22] Filed: Dec. 17, 1997

[51] Int. Cl.⁷ .................................................. H04Q 7/20
[52] U.S. Cl. ........................... 455/445; 455/414; 455/461
[58] Field of Search ..................................... 455/445, 414, 455/432, 433, 435, 417, 422, 461; 379/210, 211

[56] References Cited

U.S. PATENT DOCUMENTS

| | | | |
|---|---|---|---|
| 3,673,341 | 6/1972 | Finkhauser et al. | 379/211 |
| 5,222,128 | 6/1993 | Daly et al. | 379/221 |
| 5,724,658 | 3/1998 | Hasan | 455/445 |
| 5,826,191 | 10/1998 | Krishnan | 455/432 |
| 5,878,115 | 3/1999 | Valentin et al. | 379/59 |
| 5,901,359 | 5/1999 | Malmstrom | 455/461 |
| 5,920,812 | 7/1999 | Palviainen | 455/417 |
| 5,933,778 | 8/1999 | Buhrmann et al. | 455/461 |
| 5,943,619 | 8/1999 | Coyne et al. | 455/433 |
| 5,943,620 | 8/1999 | Boltz et al. | 455/445 |
| 5,946,623 | 8/1999 | Spradlin | 455/445 |
| 5,963,864 | 10/1999 | O'neil et al. | 455/455 |
| 5,966,653 | 10/1999 | Joensuu et al. | 455/414 |
| 5,978,673 | 11/1999 | Alperovich et al. | 455/417 |
| 6,038,455 | 3/2000 | Alperovich et al. | 455/422 |

*Primary Examiner*—Edward F. Urban
*Assistant Examiner*—Congvan Tran
*Attorney, Agent, or Firm*—Duft, Graziano & Forest, P.C.

[57] ABSTRACT

The subscriber activated wireless telephone call rerouting system enables the subscriber to reroute incoming calls to an alternate destination which is off network. This service can be activated from either the subscriber's wireless telephone or from any other telephone that is part of the wireless telephone network or the non-wireless public switched telephone network and can be deactivated by the subscriber simply initiating a call from their wireless telephone. The alternate destination selected by the subscriber can be any telephone that is part of the wireless telephone network or the non-wireless public switched telephone network, either a local calling area number or a long distance number.

14 Claims, 2 Drawing Sheets

SUBSCRIBER ACTIVATED WIRELESS TELEPHONE CALL REROUTING SYSTEM

FIELD OF THE INVENTION

This invention relates to wireless telephone networks and, in particular, to a system that enables the subscriber to receive incoming calls at a telephone that is located off the wireless telephone network.

Problem

It is a problem in wireless telephone networks to provide continuity of service when the subscriber travels into an area where wireless service is unavailable or the subscriber is located away from their wireless telephone. In either case, the subscriber cannot receive calls that are directed to their wireless telephone. Any incoming calls for the subscriber are either blocked by the wireless telephone network and a recorded announcement provided to the calling party to indicate the absence of the wireless telephone from the network or the incoming calls simply go unanswered.

In the non-wireless public switched telephone network, call forwarding services are available to the subscriber wherein the subscriber can activate the call forwarding service to reroute all incoming calls that are directed to the subscriber's listed directory number to an alternate number. This service must typically be activated by the subscriber from their listed directory number. The subscriber must also remember to deactivate the service when the subscriber returns to their listed directory number.

In the non-wireless public switched telephone network, follow-me call rerouting services are available to automatically forward an incoming call from the subscriber's listed directory number to alternate destinations in the public switched telephone network. An example of such a service is that the incoming call, when unanswered at the subscriber's listed directory number, is automatically rerouted to an alternate wired telephone in the public switched telephone network or a pager number for the subscriber. The difficulty with such a service is that the public switched telephone network cannot determine a priori whether the subscriber is located at their listed directory number and must wait until the incoming call is unanswered before the follow-me call rerouting is activated. Furthermore, the call rerouting pattern is fixed and must include only telephone equipment that is owned by te subscriber and also part of the local public switched telephone network.

Therefore, existing call forwarding and call rerouting systems are operational only within the confines of their local calling area and are not extensible to wireless telephones. These systems are also either manually activated and deactivated by the subscriber from their listed directory number or require that the call be unanswered for a predetermined period of time before the service is initiated. None of these existing systems are available to wireless subscribers and none of these systems provide the simplicity of operation desired by the wireless subscribers. For example, a wireless subscriber may not be able to activate a call rerouting feature from their wireless telephone, since the subscriber may unexpectedly enter an area where wireless service is unavailable.

Solution

The above described problems are solved and a technical advance achieved in the field by the present subscriber activated wireless telephone call rerouting system that enables the subscriber to reroute incoming calls to an alternate destination that is located off the wireless telephone network. This service can be activated from the subscriber's wireless telephone or from any other telephone that is part of either the wireless telephone network or the non-wireless public switched telephone network and can be deactivated by the subscriber simply initiating a call from their wireless telephone. The alternate destination selected by the subscriber can be any telephone that is part of the wireless telephone network or the non-wireless public switched telephone network, either a local calling area number or a long distance number.

The present subscriber activated wireless telephone call rerouting system operates by enabling a subscriber to call in to the wireless telephone network from any telephone, then be identified and authenticated by either entering a subscriber specific personal identification code or providing a voice print identification. Once the subscriber has obtained authorized access to the call rerouting service provider, the subscriber can activate the call rerouting feature to cause the wireless telephone network to reroute incoming calls destined for the subscriber's wireless telephone to a network address on the non-wireless public switched telephone network as designated by the subscriber. The activation of this feature causes the wireless telephone network to update its central database to indicate that the subscriber is off the wireless telephone network at the new designated telephone address. All subsequently received incoming calls directed to the wireless subscriber's listed number are automatically and immediately rerouted to the subscriber designated alternate destination. The wireless service provider, in response to receipt of an incoming call request for the subscriber, generates a call vector indicative of the location of the subscriber designated alternate destination. The wireless provider returns this call vector to the network that serves the calling party so that the call can be rerouted from the calling party's network provider to the subscriber designated alternate destination pursuant to the existing network call completion processes. The wireless provider can charge a fee for each call rerouted and may also bill for long distance charges incurred in rerouting the incoming call to the newly designated destination. The subscriber reenters the wireless telephone network by simply activating their wireless telephone. The reactivation of the subscriber's wireless telephone is detected by the wireless telephone network and the call rerouting feature is automatically disabled.

Therefore, the present subscriber activated wireless telephone call rerouting system provides an incoming call rerouting service that enables a subscriber to receive their incoming calls at any designated destination, with the activation of this service being effected from any telephone and the termination of this service being automatically provided once the wireless subscriber activates their wireless telephone.

DETAILED DESCRIPTION

Figure 1:
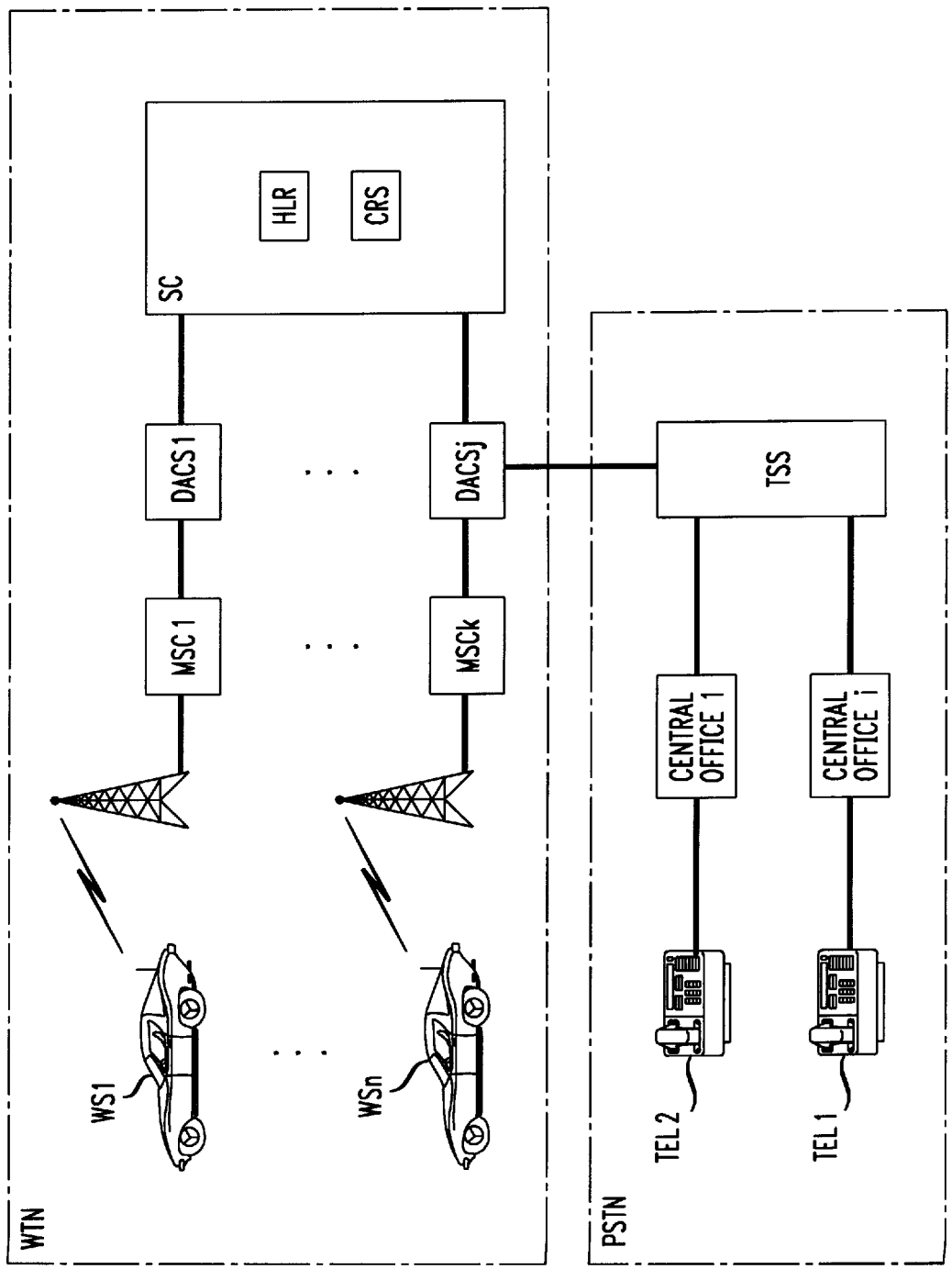
FIG. 1 illustrates in block diagram form the architecture of a typical wireless telephone network, a portion of the public switched telephone network to which it is connected and the present subscriber activated wireless telephone call rerouting system.
Figure 2:
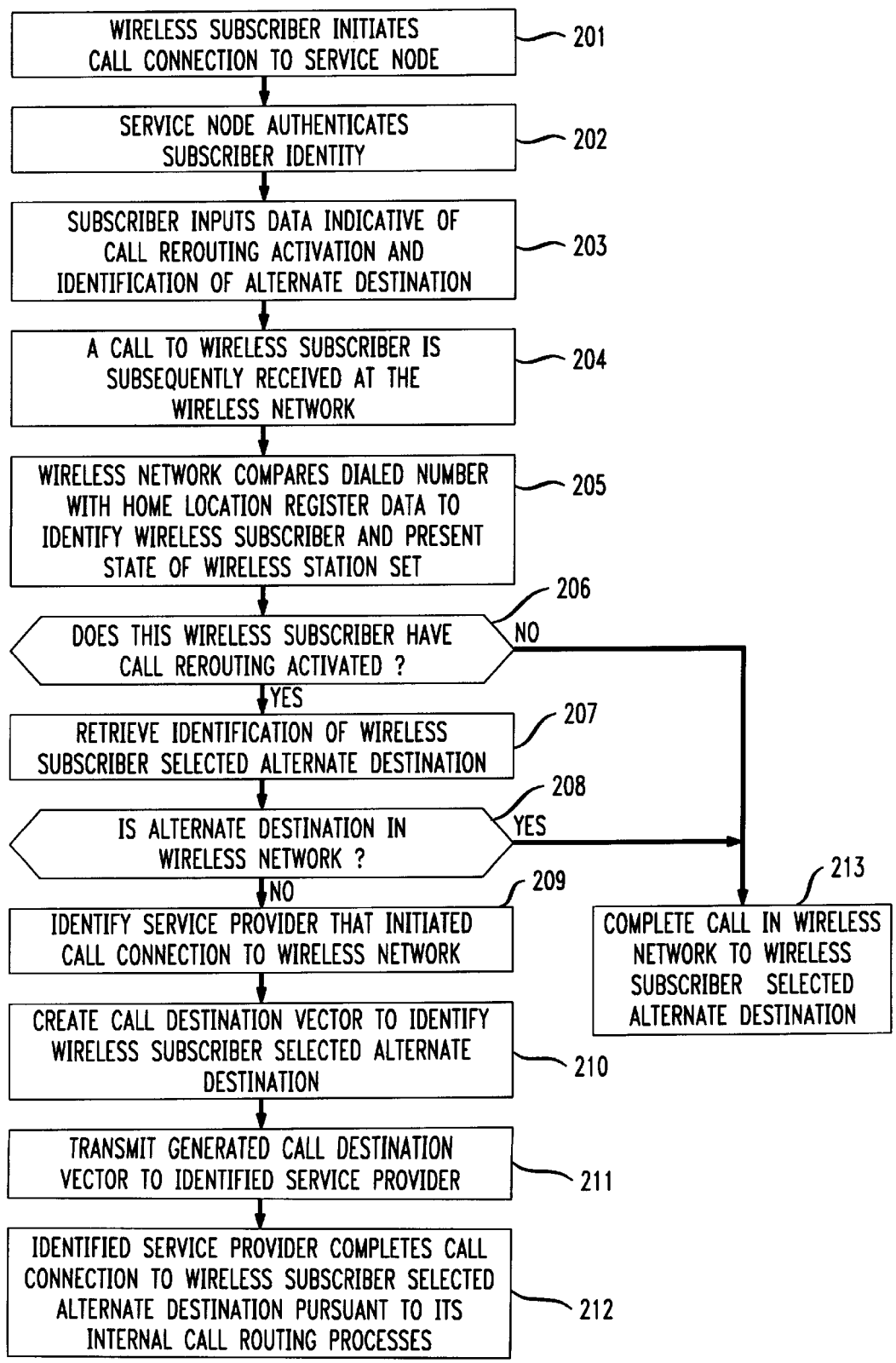
FIG. 2 illustrates in flow diagram form the operation of the present subscriber activated wireless telephone call rerouting system.

FIG. 1 illustrates in block diagram form the architecture of a typical wireless telephone network WTN, a portion of the public switched telephone network PTSN to which it is connected, and the present subscriber activated wireless telephone call rerouting system CRS, while FIG. 2 illustrates in flow diagram form the operation of the present subscriber activated wireless telephone call rerouting system CRS. The wireless telephone network WTN and the non-wireless public switched telephone network PTSN operate independently yet are cooperatively operable to process calls between the subscribers that they respectively serve. The wireless telephone network WTN includes a plurality of "Mobile Switching Centers" (MSC1–MSCk), that function to establish and manage wireless communication connections between the mobile switching center MSC and the plurality of subscribers whose wireless telephone stations WS1–WSn are active in the service area covered by the wireless transmissions of the mobile switching center MSC. The operation of this system is well known and is not described in detail herein. The wireless telephone network WTN also includes switching centers DACS1–DACSj that function to interconnect the mobile switching centers MSC and to interface the wireless telephone network WTN with the non-wireless public switched telephone network PSTN to thereby enable wireless telephone subscribers to establish call connections to other wireless telephone subscribers as well as subscribers served by the non-wireless public switched telephone network PSTN. Included in the wireless telephone network WTN is a wireless services node SC that contains a Home Location Register (HLR) that maintains records to identify valid subscribers to the wireless telephone network WTN. In the wireless telephone network WTN, the subscribers are mobile and are identified by their associated wireless telephone stations WS, which are programmed to self-identify when communicating with a mobile switching center MSC. Thus, the wireless telephone network WTN bases the subscriber's services and call connection processing on the location and identity of the associated wireless telephone station WS. The wireless telephone station WS can be any form of wireless communication device (such as analog cellular, digital cellular, personal communication system and the like) that enables the wireless subscriber to establish communications connections with a serving mobile switching center MSC.

As an example of the operation of a typical wireless telephone network WTN, when a call connection is originated by a wireless telephone subscriber, the local mobile switching center MSC1 detects the call origination and identifies the wireless telephone station WS1 used by the wireless telephone subscriber via the unique station set identification data stored in the wireless telephone station WS1. The mobile switching center MSC1 transmits data indicative of the identity of the wireless telephone station WS1, via the network switches DACS, to the wireless services node SC of the wireless telephone network WTN, which then scans the data entries in the home location register HLR to verify the wireless telephone subscriber's authority to access the requested call services. The wireless services node SC, upon verifying the authorization of the wireless subscriber to obtain the requested services, transmits control data to the local mobile switching center MSC1 which then processes the call origination in well known fashion to interconnect the wireless telephone subscriber with the designated destination. If the designated destination is a subscriber station TEL1 served by the non-wireless public switched telephone network PSTN, the wireless telephone network WTN extends the call connection and the identification of the wireless subscriber's designated destination to the non-wireless public switched telephone network PSTN via one of the network switches DACSj to enable the public switched telephone network PSTN to complete the call connection. The above noted call connection scenario is well known in wireless telephone networks WTN.

Method of Call Rerouting in a Wireless Telephone Network

The present subscriber activated wireless telephone call rerouting system CRS is resident in the wireless services node SC of the wireless telephone network WTN and operates pursuant to the steps listed in FIG. 2. In particular, a wireless subscriber elects to activate the call rerouting service for their wireless telephone station WS1. At step 201, the wireless subscriber initiates a call connection to the wireless services node SC of the wireless telephone network WTN. This is accomplished by the wireless subscriber accessing a telephone, such as TEL1, that can be anywhere on the wireless telephone network WTN (such as the subscriber's own wireless telephone station), or in the non-wireless public switched telephone network PSTN and, upon receipt of dial tone, inputting the listed directory number associated with the call rerouting service CRS provided by the wireless telephone network WTN. The common carrier that serves this telephone station set TEL1 establishes a call connection in well known fashion to the destination identified by the user input listed directory number. In the case of the wireless telephone network WTN, the listed directory number of the call rerouting service CRS represents the wireless services node SC as the call connection destination. The wireless subscriber, once connected to the wireless services node SC, can input data to initiate the call rerouting service for their wireless telephone station set WS1. Since the wireless subscriber is initiating the service request from any telephone station set TEL1, the present subscriber activated wireless telephone call rerouting system CRS must ascertain the identity of the wireless subscriber making the request. The wireless telephone network WTN bases the identification of their wireless subscribers on the self-identification capability of the associated wireless telephone stations, so this service activation must access another subscriber verification process that is part of the wireless telephone call rerouting service CRS.

Wireless Subscriber Authentication and Data Entry

For security purposes, the subscriber screening process ensures at step 202 that the wireless subscriber is the individual submitting the present service request. This subscriber authentication process uses well known technology and can be as simple as the wireless subscriber inputting data indicative of a secure user identification code that is unique to this wireless subscriber or the subscriber authentication process can be technologically sophisticated, as with a voiceprint identification of the wireless subscriber. Such processes are well known, and there are many alternatives to choose from in implementing the subscriber authentication process.

Once the wireless subscriber has been authenticated, the wireless services node SC can retrieve the subscriber records associated with this subscriber, thereby eliminating the need to have the wireless subscriber input their listed directory number. Alternatively, the wireless subscriber may be requested to input their listed directory number to confirm their identity and to elect among a number of listed directory numbers where the wireless subscriber has a number of presences in the wireless telephone network WTN. The wireless subscriber may also input data at step 203 to identify the destination (TEL2) to which their calls should be routed upon initiation of the call rerouting service. The station TEL1 being used to enable call rerouting can be automatically selected if the caller identification information is available from the serving telephone network for the call.

Once this data is input, the call rerouting service CRS is activated and all subsequently received calls directed to the wireless subscriber's listed directory number are automatically rerouted to the alternate destination TEL2 identified by the wireless subscriber.

Incoming Call Rerouting Process

The wireless telephone network central home location register HLR is updated to indicate that the subscriber is off network at the designated telephone address TEL2. When a subscriber at a telephone station, such as TEL1, subsequently originates a call destined for the wireless subscriber, which call is received at step 204 by wireless telephone network WTN, the data stored in the home location register HLR associated with this wireless subscriber is retrieved at step 205 by the wireless services node SC. The incoming call is held at the point of entry DACSj into the wireless telephone network WTN, since extending the call to the wireless services node SC is unnecessary. Control data is exchanged between the wireless services node SC and the switch DACSj that is the point of entry. The data retrieved from the home location register HLR is first analyzed to determine the present state of the wireless subscriber: active or inactive. In addition, at step 206 the wireless services node SC determines whether this wireless subscriber has call rerouting activated. If not, call processing advances to step 213 where the call is completed through the wireless telephone network WTN as is well known. If this wireless subscriber has call rerouting activated, processing advances to step 207 where the wireless services node SC retrieves the data from the home location register HLR memory location associated with the selected wireless subscriber to obtain an identification of the alternate destination. At step 208, the wireless services node SC analyzes the alternate destination identification to determine whether this alternate destination is served by the wireless telephone network WTN. If so, the call processing advances to step 213 where the incoming call is completed to the identified alternate destination via the wireless telephone network WTN.

If the alternate destination is not served by the wireless telephone network WTN, the call must be rerouted through the non-wireless public switched telephone network PTSN. In this instance, the wireless telephone network can use the data that identifies the alternated destination to extend the call connection from the wireless telephone network WTN to this destination. However, this process consumes more communication facilities than simply redirecting the call from a point closer to the calling party's telephone station set TEL1 than the wireless telephone network WTN. Since the various switching offices in the wireless telephone network and the public switched telephone network are interconnected via links that use the SS7 signaling protocol, the identification of the alternate destination can be migrated through the facilities that interconnect the calling party TEL1 and the wireless services node SC to an appropriate point where the call is extended to the alternate destination in a more efficient manner. For example, the wireless services node SC identifies the service provider that serves the calling party at step 209 and creates a call destination vector that identifies both the calling party TEL1 and the alternate destination TEL2 at step 210. This call destination vector is transmitted at step 211 to the identified service provider and at step 212 this service provider extends the call connection from the calling party TEL1 directly to the alternate destination TEL2 as is well known in telephone switching systems. The facilities used for this call completion in the present example comprise the two local switching offices CO1, CO2 and their interconnecting switching office TSS.

Thus, the incoming calls received in the wireless telephone network WTN for wireless subscribers who have activated call rerouting can be rerouted from a central point (wireless services node SC) in the wireless telephone network WTN, rather than at the local switch as is done in the public switched telephone network PTSN. This centralized rerouting of calls reduces the cost of toll charges incurred on rerouting.

Deactivation of Wireless Call Rerouting

Once the wireless subscriber has activated call rerouting, the deactivation of this service can be effected in several ways. The simple activation of the wireless telephone station WS1 by the wireless subscriber, as detected by the Mobile Switching Center MSC1, can initiate the deactivation of the present call rerouting state associated with the wireless subscriber. This deactivation is accomplished by the Mobile Switching Center MSC transmitting control signals through the intervening DACS systems to the wireless services node SC to clear the call rerouting data from the home location register HLR entry associated with the wireless subscriber station WS1. Alternatively, the mobile subscriber can manually deactivate the call rerouting by initiating a call connection to the listed directory number for the call rerouting service CRS from any telephone, whether within the wireless telephone network WTN or in the public switched telephone network PTSN. Once connected to the wireless services node SC, as requested by the dialing of this listed directory number, the wireless subscriber can deactivate the call rerouting service CRS in a manner analogous to that described above for the activation of the call rerouting service.

What is claimed:

1. In a wireless telephone network that serves a plurality of wireless telephone stations, apparatus for implementing a subscriber activated call forwarding service that reroutes all telephone calls that are directed to a wireless subscriber station to a subscriber designated alternate telephone station, comprising:

means for storing call forwarding data received from any telephone station set that is connected to said wireless telephone network via a call connection, said call forwarding data comprising data that uniquely identifies a wireless telephone station served by said wireless telephone network and a subscriber defined alternate destination to which all incoming calls directed to said wireless telephone station are to be forwarded;

means, responsive to an incoming call received at said wireless telephone network and directed to said wireless telephone station, for retrieving said stored call forwarding data associated with said wireless telephone station;

means for redirecting said incoming call to said subscriber defined alternate destination; and means, responsive to said wireless telephone station being activated, for automatically canceling said call forwarding service.

2. The apparatus for forwarding telephone calls of claim 1 further comprising:

means for authenticating an individual located at said any telephone station set to verify that said individual is authorized to activate said apparatus for forwarding telephone calls for said wireless telephone station.

3. The apparatus for forwarding telephone calls of claim 1 wherein said means for storing comprises:

home location register means in said wireless telephone network that stores subscriber data relating to said wireless telephone station.

4. The apparatus for forwarding telephone calls of claim 1 wherein said means for retrieving comprises:
   means for using data associated with said incoming call that identifies said wireless telephone station for addressing said means for storing;
   means for reading status data from said means for storing indicative of a call forwarding status for said wireless telephone station; and
   means, responsive to said retrieved status data, for completing said incoming call to said wireless telephone station absent a call forwarding status in said retrieved status data.

5. The apparatus for forwarding telephone calls of claim 4 wherein said means for retrieving further comprises:
   means, responsive to said retrieved status data indicating activated call forwarding for said wireless telephone station, for generating a call destination vector that contains data identifying said alternate destination.

6. The apparatus for forwarding telephone calls of claim 5 wherein said means for retrieving further comprises:
   means for transmitting said call destination vector to switching facilities that serve a calling party that originated said incoming call to enable said switching facilities to complete said incoming call to said alternate destination.

7. The apparatus for forwarding telephone calls of claim 1 further comprising:
   means, responsive to call forwarding cancellation data received from said individual who is validated by said means for authenticating, for deactivating said apparatus for forwarding telephone calls for said wireless telephone station.

8. In a wireless telephone network that serves a plurality of wireless telephone stations, a method for implementing a subscriber activated call forwarding service that reroutes all telephone calls that are directed to a wireless subscriber station to a subscriber designated alternate telephone station, comprising the steps of:
   storing call forwarding data received from any telephone station set that is connected to said wireless telephone network via a call connection, said call forwarding data comprising data that uniquely identifies a wireless telephone station served by said wireless telephone network and a subscriber defined alternate destination to which all incoming calls directed to said wireless telephone station are to be forwarded;
   retrieving, in response to an incoming call received at said wireless telephone network and directed to said wireless telephone station, said stored call forwarding data associated with said wireless telephone station;
   redirecting said incoming call to said subscriber defined alternate destination; and
   automatically canceling, in response to said wireless telephone station being activated, said call forwarding service.

9. The method of forwarding telephone calls of claim 1 further comprising the step of:
   authenticating an individual who initiated said call connection to verify that said individual is authorized to activate said method of forwarding telephone calls for said wireless telephone station.

10. The method of forwarding telephone calls of claim 1 wherein said step of storing comprises:
    storing subscriber data relating to said wireless telephone station in a home location register in said wireless telephone network.

11. The method of forwarding telephone calls of claim 1 wherein said step of retrieving comprises:
    using data associated with said incoming call that identifies said wireless telephone station for addressing said memory;
    reading status data from said memory indicative of a call forwarding status for said wireless telephone station; and
    completing, in response to said retrieved status data, said incoming call to said wireless telephone station absent a call forwarding status in said retrieved status data.

12. The method of forwarding telephone calls of claim 11 wherein said step of retrieving further comprises:
    generating, in response to said retrieved status data indicating activated call forwarding for said wireless telephone station, a call destination vector that contains data identifying said alternate destination.

13. The method of forwarding telephone calls of claim 12 wherein said step of retrieving further comprises:
    transmitting said call destination vector to switching facilities that serve a calling party that originated said incoming call to enable said switching facilities to complete said incoming call to said alternate destination.

14. The method of forwarding telephone calls of claim 8 further comprising the step of:
    deactivating, in response to receipt of call forwarding cancellation data from said individual who is validated by said step of authenticating, for deactivating said apparatus for forwarding telephone calls for said wireless telephone station.

* * * * *